US008424091B1

(12) United States Patent
Su et al.

(10) Patent No.: US 8,424,091 B1
(45) Date of Patent: Apr. 16, 2013

(54) AUTOMATIC LOCAL DETECTION OF COMPUTER SECURITY THREATS

(75) Inventors: Chung-Tsai Su, Taipei (TW);
Wen-Kwang Tsao, Taipei (TW);
Chung-Chi Wu, Taipei (TW); Ming-Tai Chang, Taipei (TW); Yun-Chian Cheng, Merced, CA (US)

(73) Assignee: Trend Micro Incorporated, Tokyo (JP)

( * ) Notice: Subject to any disclaimer, the term of this patent is extended or adjusted under 35 U.S.C. 154(b) by 564 days.

(21) Appl. No.: 12/686,238

(22) Filed: Jan. 12, 2010

(51) Int. Cl.
*G06F 21/00* (2006.01)

(52) U.S. Cl.
USPC ............... 726/24; 726/25; 713/187; 713/188

(58) Field of Classification Search .............. 726/22–26; 707/698; 713/187–189
See application file for complete search history.

(56) References Cited

U.S. PATENT DOCUMENTS

| | | | |
|---|---|---|---|
| 5,629,980 A | 5/1997 | Stefik et al. | |
| 5,781,550 A | 7/1998 | Templin et al. | |
| 5,884,025 A | 3/1999 | Baehr et al. | |
| 6,606,744 B1 | 8/2003 | Mikurak | |
| 6,629,081 B1 | 9/2003 | Cornelius et al. | |
| 6,671,818 B1 | 12/2003 | Mikurak | |
| 6,963,973 B2 | 11/2005 | Chapman et al. | |
| 7,042,470 B2 | 5/2006 | Rhoads et al. | |
| 7,127,741 B2 | 10/2006 | Bandini et al. | |
| 7,131,141 B1 | 10/2006 | Blewett et al. | |
| 7,152,046 B2 | 12/2006 | Wang et al. | |
| 7,298,864 B2 | 11/2007 | Jones | |
| 7,624,435 B1 | 11/2009 | Huang | |
| 7,636,716 B1 * | 12/2009 | Cheng ................................... 1/1 | |
| 8,087,081 B1 * | 12/2011 | Chun et al. ...................... 726/22 | |
| 2002/0033844 A1 | 3/2002 | Levy et al. | |
| 2003/0005331 A1 | 1/2003 | Williams | |
| 2003/0065944 A1 | 4/2003 | Mao et al. | |
| 2003/0101167 A1 * | 5/2003 | Berstis ............................... 707/3 |
| 2004/0064537 A1 | 4/2004 | Anderson et al. | |
| 2004/0068543 A1 | 4/2004 | Seifert | |
| 2005/0138081 A1 * | 6/2005 | Alshab et al. ................. 707/200 |
| 2005/0138353 A1 | 6/2005 | Spies et al. | |
| 2006/0031373 A1 * | 2/2006 | Werner et al. ................. 709/207 |
| 2006/0253484 A1 * | 11/2006 | Bangalore et al. ............ 707/102 |
| 2007/0028303 A1 * | 2/2007 | Brennan ......................... 726/24 |
| 2007/0180537 A1 | 8/2007 | He et al. | |
| 2007/0217648 A1 | 9/2007 | Muehlbauer | |
| 2007/0260872 A1 | 11/2007 | Filipi-Martin et al. | |
| 2008/0163369 A1 * | 7/2008 | Chang et al. .................... 726/22 |

OTHER PUBLICATIONS

Mohri et al. "General Suffix Automaton Construction Algorithm and Space Bounds", retrieved from http://www.cs.nyu.edu/~mohri/pub/nfac.pdf, 18 pages, published Apr. 2009.*
Fast flux—from Wikipedia, the free encyclopedia, 2 sheets [retrieved on Nov. 16, 2009], retrieved from the internet: http://en.wikipedia.org/wiki/Fast_flux.
Cluster analysis—from Wikipedia, the free encyclopedia, 13 sheets [retrieved on Nov. 16, 2009], retrieved from the internet: http://en.wikipedia.org/wiki/Cluster_analysis.
Aleksander Kotcz, et al. "Hardening Figerprinting by Context", 7 sheets, CEAS 2007—Fourth Conference on Email and Anti-Spam, Aug. 2-3, 2007, Mountain View, California.
A. Blumer, et al. "The Smallest Automation Recognizing the Subwords of a Text", 1985, pp. 31-35, Theoretical Computer Science 40, Elsevier Science Publishers B.V., North-Holland.
E. Damiani, et al. "An Open-based Technique for Spam Detection", 2004, 6 sheets, Proceedings of the 4th IEEE international conference on peer-to-peer computing.
Allen Chang "Content Fingerprinting Technology by Using Context Offset Sequence and Suffix Automata", 2008, 8 sheets, Copyright 2008 Trend Micro Incorporated.

* cited by examiner

*Primary Examiner* — Hadi Armouche
(74) *Attorney, Agent, or Firm* — Okamoto & Benedicto LLP

(57) ABSTRACT

A system for locally detecting computer security threats in a computer network includes a processing engine, a fingerprint engine, and a detection engine. Data samples are received in the computer network and grouped by the processing engine into clusters. Clusters that do not have high false alarm rates are passed to the fingerprint engine, which generates fingerprints for the clusters. The detection engine scans incoming data for computer security threats using the fingerprints.

16 Claims, 14 Drawing Sheets eNewsLetter

Aging
Health information especially for seniors.

Exercising as you age
Staying active is one of the best thigs a senior can do to enjoy a longer, healthier and more independent life.
Read more Any amorous dreams you want to realise, and ideas you have about you-and-your-girl-making-out:
It all will come true after you take super V-vitamin! Cheaper than $1 on our site Only! Catch perfect opportunity and drill your girl well!
Read more

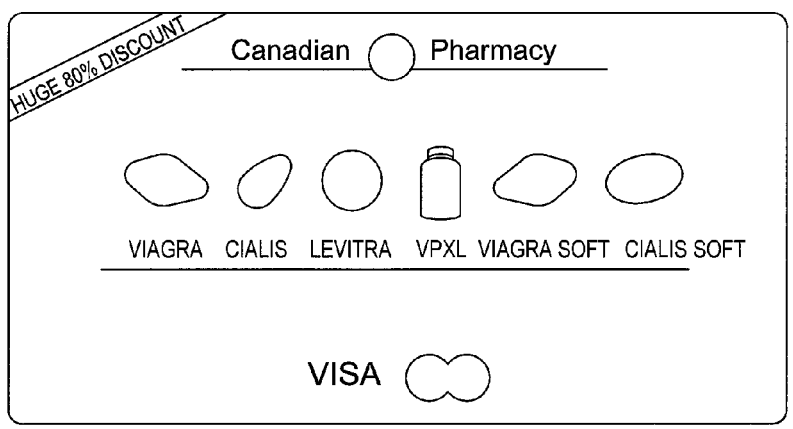

Produce safety: Avoid foodborne illness
Tips for safely handling produce.
Read more Manage your subscription

FIG. 14

| Item | Content | | | |
|---|---|---|---|---|
| NO. | 424 | | | |
| TimeStamp | 1252395810 | | | |
| Date | Tue Sep 8 07:43:31 2009 GMT | | | |
| LCS | Nothing gives such a fresh and confident look as a fashionable brand new watch especially when it has the famous name of a world-known designer and moreover when the timepiece has a very friendly price | | | |
| Length | 201 | | | |
| Spam Rank | High(3) | | | |
| Mails | 29 | | | |
| Spam category | Commercial/Products(0.1):watch(1); | | | |
| Action | *** Need to trigger URL feedback NOW ***(1) | | | |
| URLs (3) | Frequency | URL | | |
| | 5 | http://iblmohea.cn | | |
| | 17 | http://ihrvfrea.cn | | |
| | 7 | http://iietrpea.cn | | |
| DomainNames (3) | Domain Name | TTL | Number | IPs |
| | iblmohea.cn | 600 | 1 | 211.95.78.84 |
| | ihrvfrea.cn | 600 | 1 | 211.95.78.84 |
| | iietrpea.cn | 600 | 1 | 211.95.78.84 |
| IPs (3) | IP | Number | Domain Name | |
| | 211.95.78.84 | 3 | iblmohea.cn ihrvfrea.cn iietrpea.cn | |

FIG. 15

AUTOMATIC LOCAL DETECTION OF COMPUTER SECURITY THREATS

BACKGROUND OF THE INVENTION

1. Field of the Invention

The present invention relates generally to computer security.

2. Description of the Background Art

Computer security threats include malicious codes and online threats. Examples of malicious codes include computer viruses, worms, Trojans, rootkits, and spyware. Online threats include various schemes of distributing malicious codes online, and other computer security threats that rely on the anonymity, freedom, and efficient communication provided by the Internet, such as denial of service (DoS) attacks, network intrusion, phishing, and spam.

Products for combating computer security threats are commercially available from various computer security vendors. These computer security vendors typically employ a team of antivirus researchers and data collection nodes (e.g., honey pots) to identify and provide solutions against discovered computer security threats. These solutions, which are also referred to as "antidotes," are distributed by the vendors to their customers in the form of updates. The updates may include a new pattern file containing new signatures or updated signatures for detecting computer security threats by pattern matching. One problem with this approach is that computer security threats can mutate rapidly and periodically, making them difficult to identify by pattern matching. Another problem with this approach is that the size of pattern files continues to increase as more and more computer security threats are identified. Mutation of existing computer security threats contributes to this volume problem as it increases the number of patterns for a computer security threat. Yet another problem with this approach is that targeted threats, i.e., an attack on a particular organization rather than on the Internet as a whole, may remain undetected because of legal issues associated with receiving and analyzing data, such as emails containing confidential or personal information, from particular companies and its personnel.

SUMMARY

In one embodiment, a system for locally detecting computer security threats in a computer network includes a processing engine, a fingerprint engine, and a detection engine. Data samples are received in the computer network and grouped by the processing engine into clusters. Clusters that do not have high false alarm rates are passed to the fingerprint engine, which generates fingerprints for the clusters. The detection engine scans incoming data for computer security threats using the fingerprints.

These and other features of the present invention will be readily apparent to persons of ordinary skill in the art upon reading the entirety of this disclosure, which includes the accompanying drawings and claims.

DESCRIPTION OF THE DRAWINGS

FIG. 14 shows an example email in a spam cluster processed by an antispam system in accordance with an embodiment of the present invention.

FIG. 15 shows information for an example spam cluster generated by a clustering processing engine in an antispam system in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
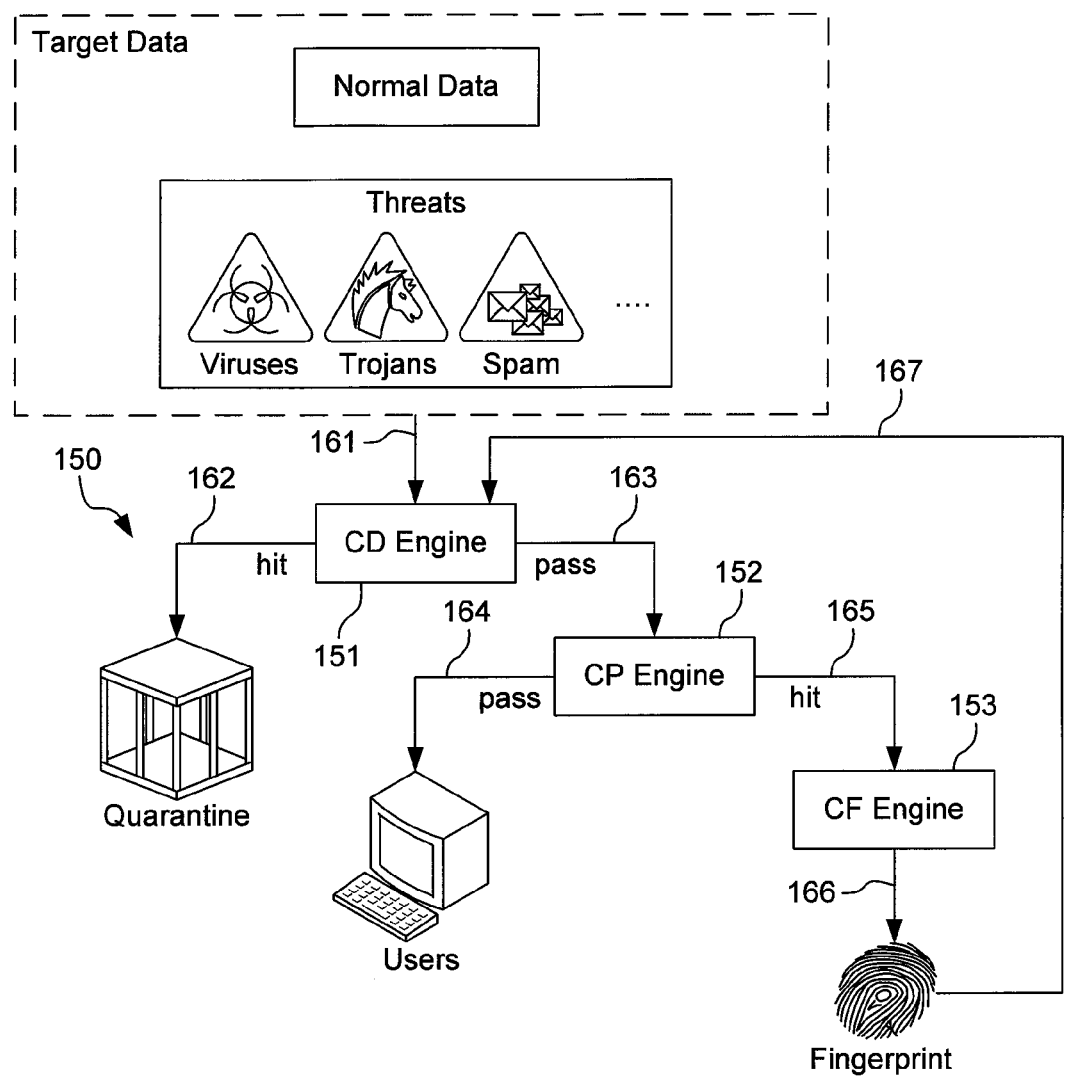
FIG. 1 schematically shows a system for locally detecting computer security threats in accordance with an embodiment of the present invention.

FIG. 1 schematically shows a system 150 for locally detecting computer security threats in accordance with an embodiment of the present invention. In the example of FIG. 1, the system 150 comprises a clustering detection ("CD") engine 151, a clustering processing ("CP") engine 152, and a clustering fingerprint ("CF") engine 153. The engines 151, 152, and 153 may comprise computer-readable program code running in a computer system, which may comprise one or more computers. For example, the detection engine 151 and the processing engine 152 may be running in a gateway computer configured to detect for computer security threats at a perimeter of a computer network, while the fingerprint engine 153 may be running in another computer separate from the gateway computer. All of the engines 151, 152, and 153 may also be running in the gateway computer. The system 150 is preferably operated locally within a private computer network. As will be more apparent below, the system 150 is especially suitable for local operation as it does not necessarily require updates from an external source. The system 150 allows for automatic threat identification and detection within the confines of the private computer network without necessarily needing threat information from a computer external to the private computer network.

In one embodiment, the clustering processing engine 152 is configured to cluster together those computer security threats having the same intention or purpose. For example, the processing engine 152 may be configured to detect and form a cluster comprising a computer virus, another cluster comprising a Trojan, another cluster comprising spam, and so on. The processing engine 152 may be configured to receive sample data, such as those collected from sources like email traffic or web page requests of an enterprise or other organization. Legal issues involving privacy concerns may be alleviated by deploying the processing engine 152 locally by the organization and within the organization's computer network. The processing engine 152 may regularly group sample data together and generate threat clusters based on the sample's intention, which may be to spam, spread a computer virus, install a Trojan, gain unauthorized access to the network, etc.

In one embodiment, the clustering fingerprint engine 153 is configured to generate threat fingerprints representing threat clusters generated by the clustering processing engine 152. For example, the fingerprint engine 153 may be configured to generate fingerprints for computer viruses, Trojans, spam emails, etc. The fingerprint engine 153 may be configured to automatically generate fingerprints and forward the fingerprints to the clustering detection engine 151. This allows the detection engine 151 to detect and filter out security threats that are similar to threats previously processed by the processing engine 152.

In one embodiment, the clustering detection engine 151 is configured to detect a computer security threat by scanning incoming data (e.g., email, file, web page) for data that matches fingerprints generated by the fingerprint engine 153.

In the example of FIG. 1, the system 150 receives incoming data, also referred to as "target data", for threat evaluation (arrow 161). The target data may include normal (i.e., legitimate or non-malicious) data as well as data containing computer security threats, such as viruses, Trojans, or spam emails. The target data may be coming from outside the computer network where the system 150 is implemented. The clustering detection engine 151 scans the target data for security threats using fingerprints locally generated by the clustering fingerprint engine 153. If a target data matches one of the fingerprints in the detection engine 151, the target data will be blocked by placing the target data in quarantine (arrow 162). Otherwise, the detection engine 151 forwards the target data to the clustering processing engine 152 (arrow 163).

Even when target data does not match a fingerprint in the detection engine 151, it is possible that the target data is an unknown or yet to be discovered security threat. In view of this possibility, the processing engine 152 gathers samples of target data and generates clusters of the samples. In one embodiment, the processing engine 152 is configured to score the threat propensity of each cluster. That is, the processing engine 152 determines the likelihood that a cluster of samples is a security threat. If target data received from the detection engine 151 belongs to a cluster with relatively low likelihood of being a security threat, the processing engine 152 forwards the target data to the user (arrow 164).

Clusters that are likely to be a security threat are forwarded by the processing engine 152 to the clustering fingerprint engine 153 (arrow 165). The fingerprint engine 153 may generate a fingerprint of the cluster by employing a transformation algorithm to extract common features from each sample of the cluster. These common features may be selected based on tolerance for mutation, compact and concise representation, efficiency and rapidity of comparison, and sufficiently low false alarm rate. The fingerprint engine 153 packs these features into a fingerprint to represent the characteristics of the threat cluster (arrow 166). The fingerprint engine 153 forwards the fingerprints to the detection engine 151 (arrow 167), which uses the fingerprints to detect security threats.

Figure 2:
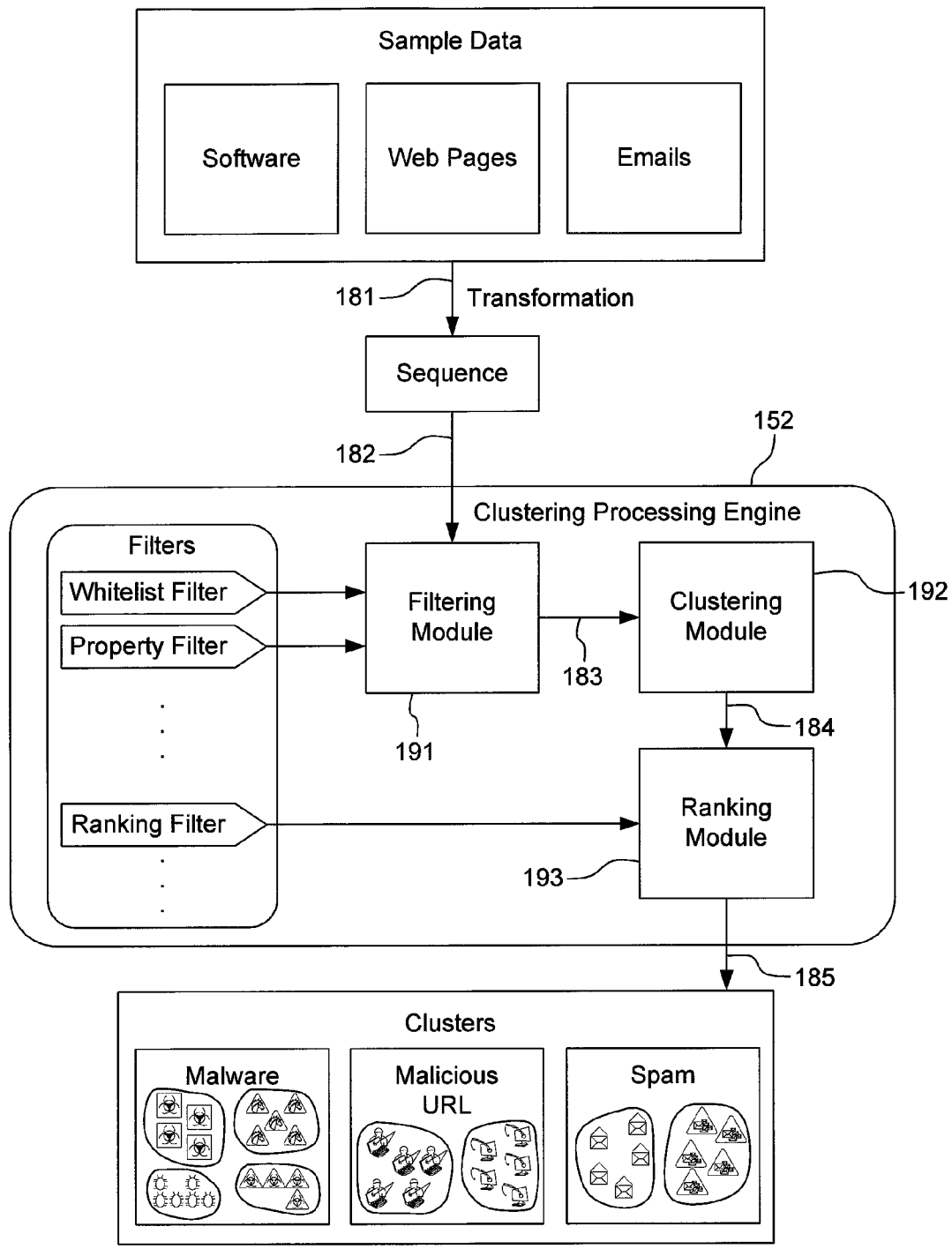
FIG. 2 schematically shows a clustering processing engine in accordance with an embodiment of the present invention.

FIG. 2 schematically shows the clustering processing engine 152 in accordance with an embodiment of the present invention. In the example of FIG. 2, the processing engine 152 comprises a filtering module 191, a clustering module 192, and a ranking module 193. The processing engine 152 may be configured to detect computer security threats in various data formats including, email, web pages, executable and data files, and other formats. To accommodate different data formats, data samples that are input to the processing engine 152 are first transformed into standardized representation (arrow 181). Preferably, the data samples are transformed into the standardized representation using a process that results in relatively low information loss. In one embodiment, the data samples are transformed using a sequence representation. The sequence representation is a natural transformation of email, web pages, and malware. Regardless of the threat being detected, the sample data is transformed to a sequence that describes the sample data's intention or behavior. As a particular example, the intention of an email may be analyzed according to the sequence of its message body. A web page may be represented by the API calling sequence of its script or its HTML tag sequence. The behavior sequence of malicious code may be represented by its binary code. The transformation of sample data into sequence representation may be performed by program code of the processing engine 152, such as by the filtering module 191 or another module not shown.

In one embodiment, the filtering module 191 is configured to filter incoming data samples (which in this example are in sequence representation) so that similar samples can be easily identified for clustering. For example, the filtering module 191 may detect normal data and remove them from further processing. Using antispam as a particular example application, a whitelist filter and a property filter may be employed as plug-in to the filtering module 191. The whitelist filter for antispam may comprise a customized filter for users. The customized filter may be configured to filter out emails having sender names, sender domains, sender IP, and/or subject that are known to be associated with normal emails. Sample emails that match conditions of the whitelist filter may be provided to users without further processing by the processing engine 152. A property filter allows the processing engine 152 to filter out unrelated samples according to their nature. Using antispam as a particular example application, an individual email has its language, length, encoding, and format. The property filter for antispam may be used to filter out those emails with different languages and body lengths so that the processing engine 152 does not further process them.

Sample data that has not been filtered out by the filtering module 191 are input to the clustering module 192 (arrow 183). In one embodiment, the clustering module 192 is configured to group data samples into clusters. Machine learning algorithms that may be used by the clustering module 192 to form the clustering include exclusive clustering, overlapping clustering, hierarchical clustering, probabilistic clustering, and two-way clustering. Other suitable clustering algorithms may also be employed. An important consideration in selecting a clustering algorithm is time and space complexity. Since a clustering algorithm is designed with a certain type of dataset or topic in mind, there is no single perfect clustering algorithm suitable for all kinds of problems. A clustering algorithm for the processing engine 152 may be selected based on what is expected to be uncovered from the sample data, which may vary by application. For example, to find the longest common substring in a large number of emails, suffix tree clustering (STC) is a good candidate for the clustering module 192 because of the linear time complexity of building a suffix tree. In every internal node of the suffix tree, there is a set of emails that contains the same sub-sentence or sentences. The set of emails may be formed as a cluster whose members have the same purpose. After removal of redundant clusters, several clusters are generated and output to the next process, which in this case is the ranking module 193 (arrow 184).

It is to be noted that a clustering algorithm, rather than a classification algorithm, is employed by the processing engine 152. This is because the system 150 (see FIG. 1) is designed to identify even those security threats that are yet to be generally known. Classification requires pre-building of a model for detection, and it is very difficult to build a good model for classification to detect unknown security threats. Accordingly, the processing engine 152 advantageously employs a clustering module instead of a classification module.

In the example of FIG. 2, the clustering processing engine 152 optionally includes a ranking module 193. Although the clustering processing engine 152 can output all of the threat clusters generated by the clustering module 192, an overly large number of clusters may overload the clustering fingerprint engine 153. In one embodiment, the ranking module 193 is configured to determine the propensity for malice of each cluster. That is, the ranking module 193 determines the likelihood that a cluster comprises samples that have malicious intentions. For example, the ranking module 193 may assign a malicious score to each cluster. Malicious score may be computed differently for malicious codes or web pages. For web pages, web page information, such as URL links the web page refers to, reputation of the domain and IP address of the web page host, etc., may be used to compute the malicious score. For malicious codes, the malicious score may take into account the similarity of the malicious code to a known malicious code based on the matched code subsequence (e.g., using suffix automata), the kind of instructions or API's the malicious code is using, e.g., dropping a similar executable file or registry, the length of the common code subsequence in the cluster, etc.

The higher the malicious score, the higher the cluster's propensity for malice. The ranking module 193 correlates samples in a cluster and ranks all the clusters according to their malicious scores. A ranking filter may be employed to filter out clusters that are not yet suitable to be fingerprinted for use to detect computer security threats. If the ranking of a cluster is high (e.g., higher than a threshold), the cluster may be passed immediately to the clustering fingerprint engine 153. On the other hand, if the ranking of the cluster is low or medium, the cluster may comprise normal data. In that case, it is premature to fingerprint the cluster for detection. The ranking filter may filter out those clusters that are not ranked higher than a predetermined threshold. High ranking clusters are output by the ranking module 193 to the fingerprint engine 153. In the example of FIG. 2, the ranking module 193 outputs clusters of malicious codes ("malware"), malicious URLs (uniform resource locator), and spam emails. The different clusters of malicious codes may represent different malicious codes, the different clusters of spam emails may represent different spam emails, etc. A particular malicious code and its variants may be represented by a single cluster.

Generally speaking, a cluster with a medium ranking score (e.g., within a predetermined range) indicates that the cluster may be part of an attack that is developing and needs to be closely monitored. Therefore, an incremental clustering mechanism is recommended. With an incremental clustering mechanism, the ranking module 193 feeds the cluster back to the clustering module 192 if the cluster's malicious score is not high enough. This limits the clusters provided to the clustering fingerprint engine 153.

Figure 3:
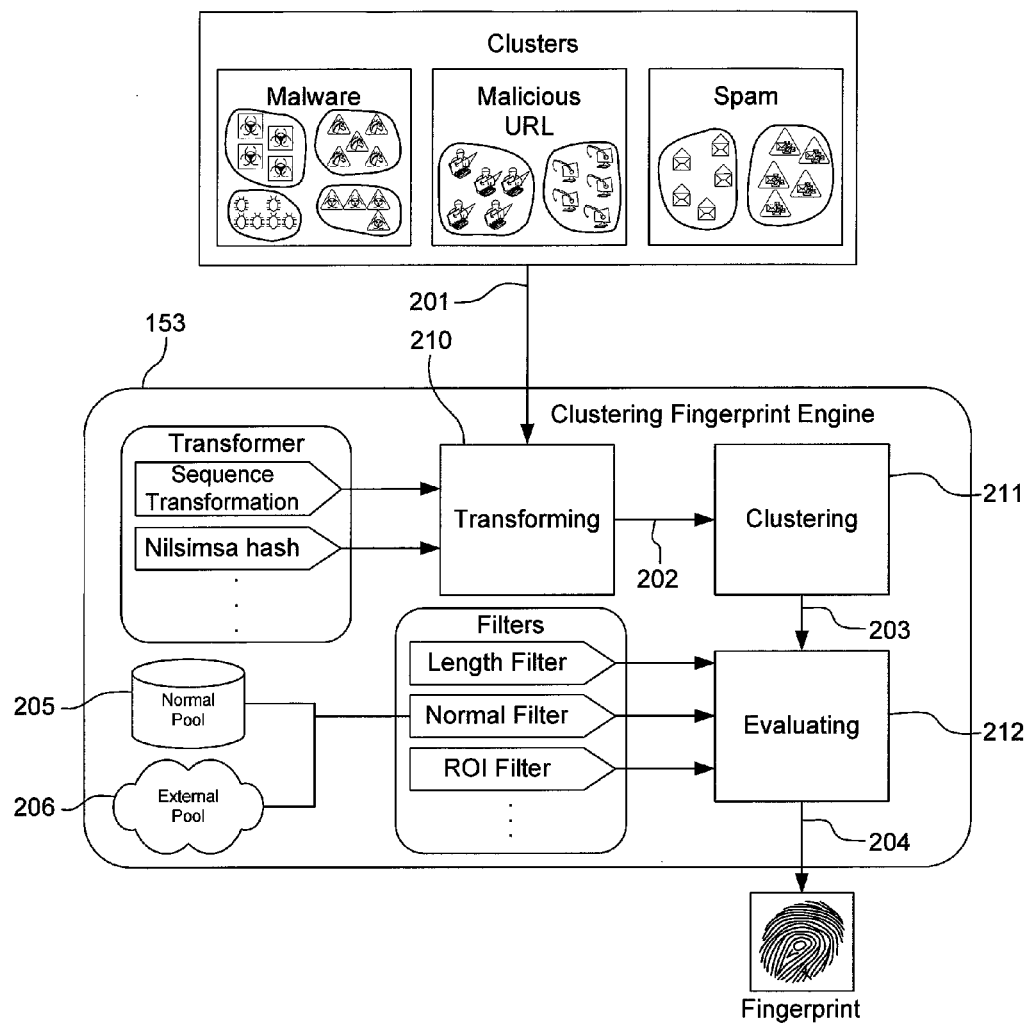
FIG. 3 schematically shows a clustering fingerprint engine in accordance with an embodiment of the present invention.

FIG. 3 schematically shows the clustering fingerprint engine 153 in accordance with an embodiment of the present invention. In the example of FIG. 3, the clustering fingerprint engine 153 comprises a transforming module 210, a clustering module 211, and an evaluation module 212. The clustering fingerprint engine 153 receives clusters of sample data from the clustering processing engine 152. In the example of FIG. 3, the clustering fingerprint engine 153 receives clusters of malicious codes, clusters of malicious URLs, and clusters of spam e-mails (arrow 201). The clustering fingerprint engine 153 is configured to automatically generate fingerprints of threat clusters received from the clustering processing engine 152.

In one embodiment, the transforming module 210 is configured to transform samples of a cluster into a representation that has tolerance for mutation. Unlike the transformation in the clustering processing engine 152, the transforming module 210 is geared towards transforming samples of a cluster into a form that adapts to threat mutation rather than preventing information loss. Accordingly, the transforming module 210 may employ a transformation algorithm that has good tolerance for string shifting, string rotation, and partial mutation. Each transformed threat cluster should show its nature with no or minimal noise or other feature that would obscure the nature of the threat cluster. Example transformation techniques that may be employed by the transforming module 210 include Nilsimsa hash and offset sequence transformation technology.

An example offset sequence transformation algorithm for transforming a sequence T into a sequence $OFFSET_{P_s}$ is given by EQ. 1:

$$OFFSET_{P_S}(i) = P_S(i+1) - P_S(i); i = 1 \sim \text{Length}(P_S) - 1 \quad (EQ. 1)$$

where:
  A: all alphabets.
  T: the original sequence with length of N;

$T = (t_1, t_2, \ldots, t_N); \forall t_i A, i = 1 \sim N;$

S: the set of alphabets of interest;
T$_S$: the noiseless sequence after filtering by S;

$$Ts(i) = \begin{cases} T(i), \text{ if } (T(i) \in S); \\ '-', \text{ otherwise} \end{cases} i = 1 \sim N;$$

Pos(T$_S$): the position of alphabet in T$_S$;

Pos($t_1$)=1;Pos($t_2$)=2; . . . ;Pos($t_N$)=N;

P$_S$: the position sequence of alphabets in T$_S$ except '–'

As a particular example, an original sequence "Here can find the finest rolex watch replica" may be transformed to a sequence OFFSET$_{Ps}$ as follows:
T: Here can find the finest rolex watch replica
S: {a,e};
T$_S$: -e-e---------a----e------e---a-----a-----e----a
P$_S$: (2,4,7,17,22,29,33,39,44);
Gap: 2 3 10 5 7 4 6 5
OFFSET$_{Ps}$: (2,3,10,5,7,4,6,5);

In the immediately above example, the characters "a" and "e" are found in positions 2,4,7,17,22,29,33,39,44 of the original sequence T. The gaps between the characters of interests are 2, 3, 10, 5, 7, 4, 6, 5. Gap indicates the position of a character of interest relative to the immediately preceding character of interest. For example, the second instance of the character "e" is two positions (i.e., gap of 2) from the first instance of the character "e", the first instance of the character "a" is three positions (i.e., gap of 3) from the second instance of the character "e", and so on. Note that Gap is the same as the OFFSET$_{Ps}$.

Replacing 'l' with '1' and 'o' by '0' is a popular approach in spam emails. Mutating the example sequence T to T$_1$ by replacing 'l' with '1' and 'o' by '0' results in
T$_1$: Here can find the finest rOlex watch replica
S: {a,e};
T$_S$: -e-e--a---------e----e------e---a-----e----a
P$_S$: (2,4,7,17,22,29,33,39,44);
OFFSET$_{Ps}$: (2,3,10,5,7,4,6,5);

Note that the resulting transformed sequence OFFSET$_{Ps}$ is the same even with the mutation. The transformed sequence remains essentially the same even in some situations where the sequence T is mutated by changing several words without changing the meaning of the sentence. For example, assuming a sequence T$_2$ "you can get the best ro1ex watch rep1ica,"
T$_2$: you can get the best ro1ex watch rep1ica
S: {a,e};
T$_S$: -----a---e----e--e------e---a-----e----a
P$_S$: (6,10,15,18,25,29,35,40);
OFFSET$_{Ps}$: (4,5,3,7,4,6,5);

the resulting transformed sequence OFFSET$_{Ps}$ still retains the last four positions of the OFFSET$_{Ps}$ of the original sequence T (see the sequence " . . . , 7, 4, 6, 5" of OFFSET$_{Ps}$). The above sequence transformation algorithm is resistant to mutations involving string shifting and word or character replacement. As can be appreciated, other sequence transformation algorithms may also be used without detracting from the merits of the present invention.

Continuing with FIG. 3, the threat clusters in sequence representation are provided to the clustering module 211 (arrow 202). In one embodiment, the clustering module 211 of the clustering fingerprint engine 153 operates in the same manner as the clustering module 192 of the clustering processing engine 152. However, these two clustering modules are adopted for different purposes. In the clustering processing engine 152, the clustering module 192 groups threats with the same intention into a cluster. In the clustering fingerprint engine 153, the clustering module 211 clusters longer invariant subsequences, which provide better materials for generating an effective fingerprint for detecting a certain threat.

The output of the clustering engine 211 may comprise some invariant subsequences, which are used as fingerprints by the clustering detection engine 151. In the example of FIG. 3, the fingerprints are provided to the evaluation module 212 (arrow 203) prior to being forwarded to the clustering engine 151.

Before a fingerprint is automatically activated in the clustering detection engine 151, the clustering fingerprint engine 153 is configured to first check whether the fingerprint will cause false alarms (also known as "false positives"), and the degree of the false alarms. Because a particular approach or algorithm cannot guarantee against false alarms in the future, one could calculate the false alarm rate from past to current if enough samples are collected. The system 150 (see FIG. 1) is preferably deployed as a smart client or a local cloud solution, with customer/user agreement to data collection, to address possible legal issues. In one embodiment, the system 150 assumes that if a fingerprint did not result in unacceptable false alarm rate in the past, it will not do so in the future. Therefore, the evaluation module 212 can evaluate a new fingerprint for false alarms using a sample pool (labeled 205 in FIG. 3) collected from users of the computer network where the system 150 is deployed. The evaluation module 212 may also check the fingerprint against samples from an external source (labeled 206 in FIG. 3), such as data samples from a computer security vendor, such as Trend Micro, Inc.

In the example of FIG. 3, the evaluation module 212 employs a length filter, a normal filter, and an ROI (return on investment) filter. The length filter filters out short fingerprints because short fingerprints may result in a high number of false alarms. The normal filter allows for calculation of false alarm rate of each fingerprint using a user-defined normal email pool, such as the normal pool 205. The ROI filter decides which kind of solution technology is more suitable to represent the intention of the cluster. For example, offset sequence transformation may be more suitable in representing a cluster of spam emails compared to a hash key approach if the cluster comprises a lot of mutating spam emails.

Fingerprints that are deemed to have a low false alarm rate (e.g., below a predetermined false alarm threshold) are output by the evaluation module 212 as fingerprints for use by the clustering detection engine 151. The fingerprints that are outputted by the evaluation module 212 may also be provided to a remotely located server for evaluation and further refinement by antivirus researchers, for example.

Figure 4:
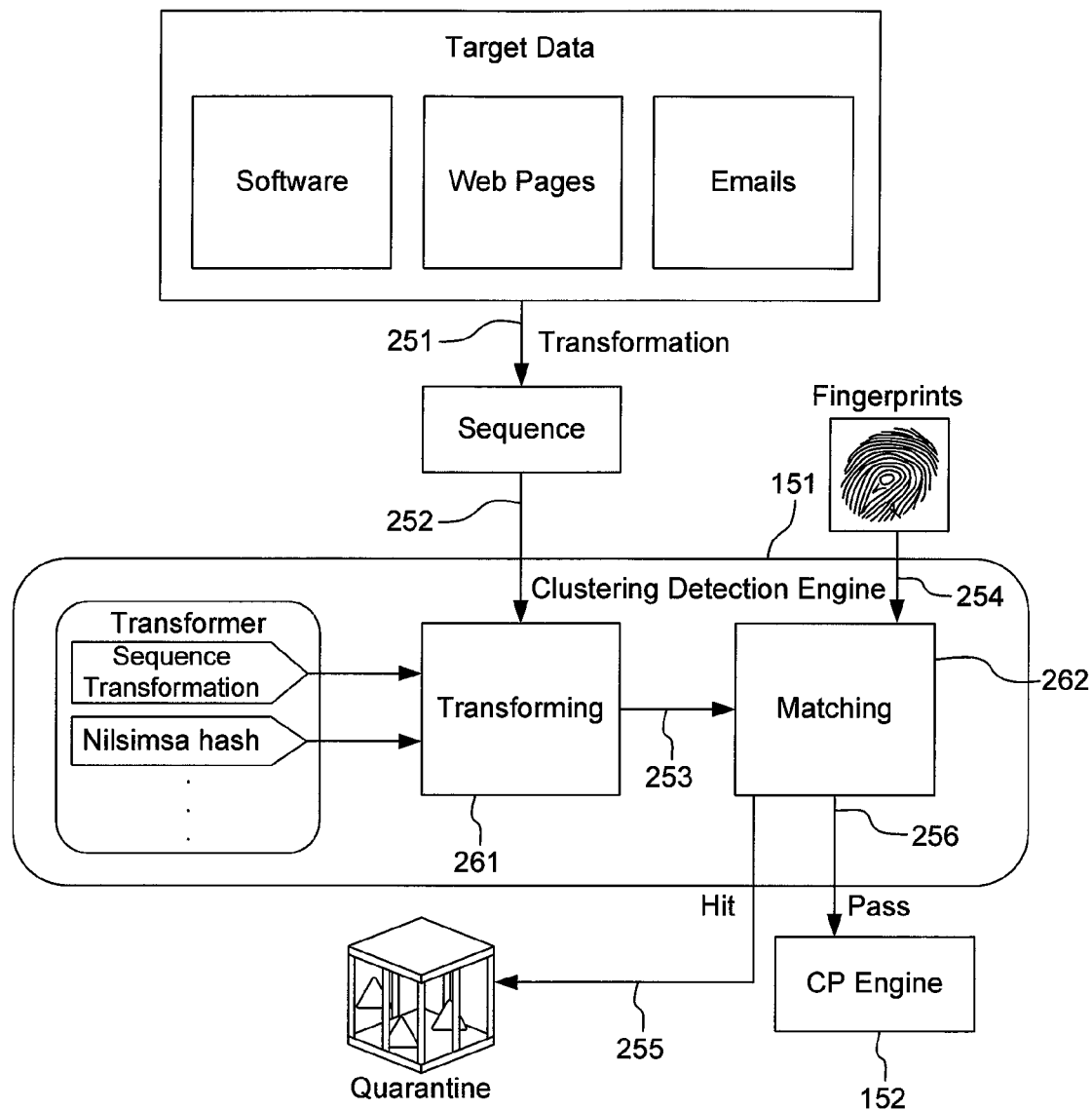
FIG. 4 schematically shows a clustering detection engine in accordance with an embodiment of the present invention.

FIG. 4 schematically shows the clustering detection engine 151 in accordance with an embodiment of the present invention. In the example of FIG. 4, the clustering detection engine 151 comprises a transforming module 261 and a matching module 262. As shown in FIG. 4, the detection engine 151 is configured to receive fingerprints (arrow 254) from the fingerprint engine 153, and scan incoming target data against the fingerprints.

In one embodiment, the transforming module 261 of the clustering detection engine 151 is the same as the transforming module 210 of the clustering fingerprint engine 153. This allows for matching of the target data against fingerprints that were generated from transformed sample data. In the example of FIG. 4, the transforming module 261 receives target data comprising software, web pages, and emails (arrow 251). The target data are first transformed into a standardized representation, such as sequence representation, that is the same as that used by the clustering processing engine 152 to input sample data to the filtering module 191. The transformation into the standardized representation may be performed by the transforming module 261 or other modules of the clustering detection engine 151. The sequence representations of the target data are then further transformed by the transforming module 261 (arrow 252) using the same algorithm (e.g., sequence transformation, Nilsimsa hash) as that used by the transforming module 210 of the clustering fingerprint module 153.

In one embodiment, the matching module 262 is configured to match transformed target data received from the transforming module 261 (arrow 253) against fingerprints received from the clustering fingerprint engine 153. When target data matches a fingerprint, the matching module 262 blocks the target data for quarantine (arrow 255). Otherwise, the matching module 262 provides the target data to the clustering processing engine 152 (arrow 256) as previously described with reference to FIG. 1.

The clustering detection engine 151 preferably has an efficient matching module 262 in order to perform lightweight computation. The matching module 262 preferably supports complete matching and partial matching with linear time complexity because there are very large numbers of emails, files, web pages, and documents that potentially may be received over the Internet. In one embodiment, the matching module 262 employs suffix automata for efficient and fast sequence matching. Suffix automata allows for linear construction and linear scanning. Fingerprints received from the clustering fingerprint engine 153 may be built into suffix automata. Building fingerprints into suffix automata only takes linear time, which depends on the length of the fingerprint.

As can be appreciated from the foregoing, the system 150 (see FIG. 1) may be employed to detect various security threats. In the following examples beginning with FIG. 5, the system 150 has been configured for antispam applications. It is to be noted, however, that the system 150 may also be configured to detect other types of computer security threats without detracting from the merits of the present invention.

Figure 5:
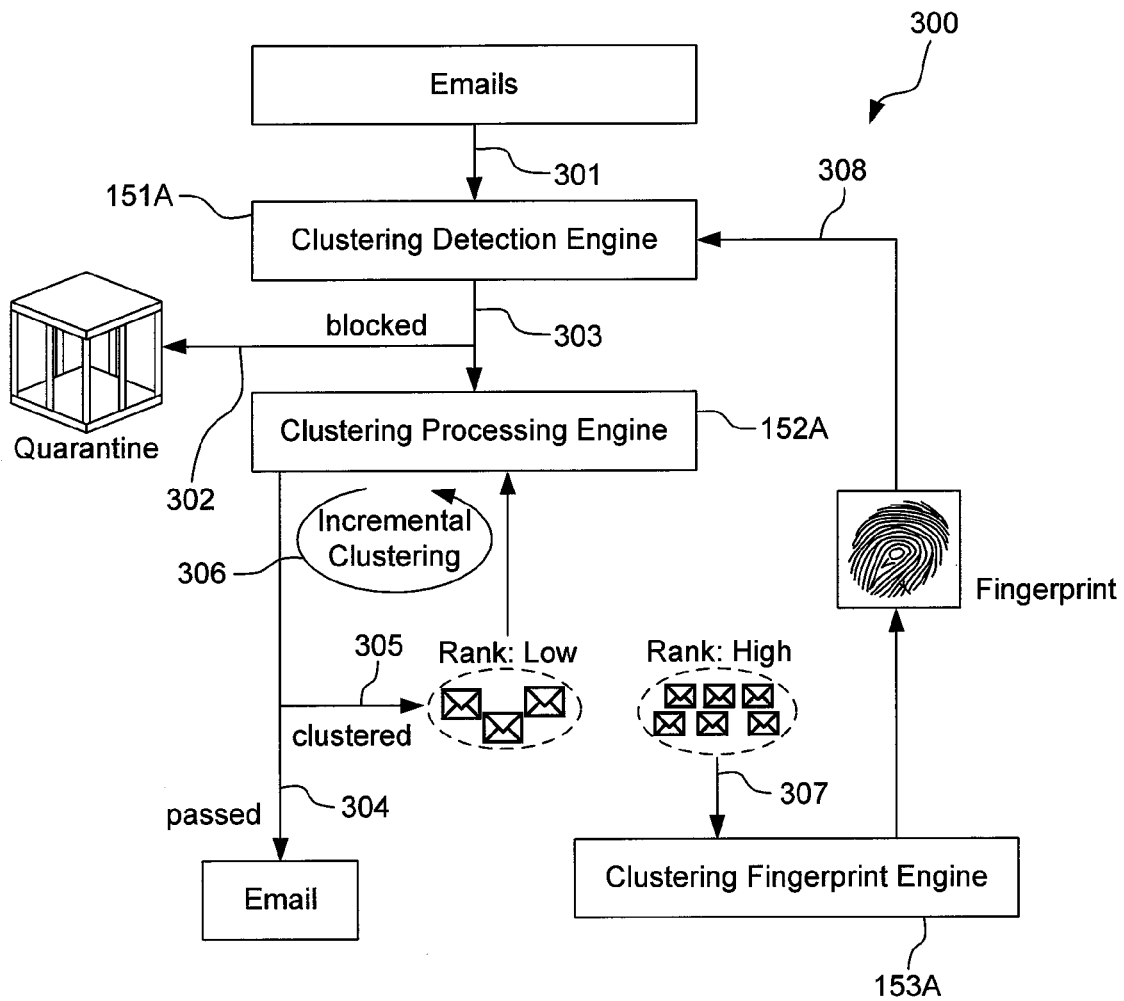
FIG. 5 schematically shows an antispam system in accordance with an embodiment of the present invention.

FIG. 5 schematically shows an antispam system 300 in accordance with an embodiment of the present invention. The system 300 is a particular embodiment of the system 150 shown in FIG. 1. In the example of FIG. 5, the clustering detection engine 151A, the clustering processing engine 152A, and the clustering fingerprint engine 153A are the same as the clustering detection engine 151, the clustering processing engine 152, and the clustering fingerprint engine 153, respectively, except configured specifically to detect spam email.

In the example of FIG. 5, incoming emails are directly transformed to sequence representation from their mail content prior to being scanned by the clustering detection engine 151A for spam (arrow 301). The clustering detection engine 151A matches each incoming email against fingerprints of spam emails generated by the clustering fingerprint engine 153A (arrow 308). Incoming emails that match a fingerprint are blocked and sent to quarantine (arrow 302). Emails that do not match a fingerprint are provided to the clustering processing engine 152A (arrow 303). After a period of time (e.g., after 15 minutes or after receiving a predetermined number of emails), the clustering processing engine 152 will perform clustering to group together emails that have the same subsequence. If an email is not clustered by the clustering processing engine 152A, that email is passed to users (arrow 304). If a cluster is formed by the clustering processing engine 152A (arrow 305), the clustering processing engine will score the cluster based on the likelihood that the cluster comprises spam emails. The clustering processing engine 152 ranks clusters based on their score. If a cluster is ranked as low or medium, some pivots in the cluster will be added into the clustering processing engine 152A again for incremental clustering (arrow 306). The clustering processing engine 152A outputs all clusters with high ranks to the clustering fingerprint engine 153A (arrow 307). The clustering fingerprint engine 153A transforms each email of a cluster into its offset sequence, and then performs clustering to find the longest common offset sequence. After testing using a normal pool of emails, fingerprints that result in relatively high false positives are dropped. Fingerprints with acceptable false alarm rates are automatically delivered to the clustering detection engine (arrow 308).

Figure 6:
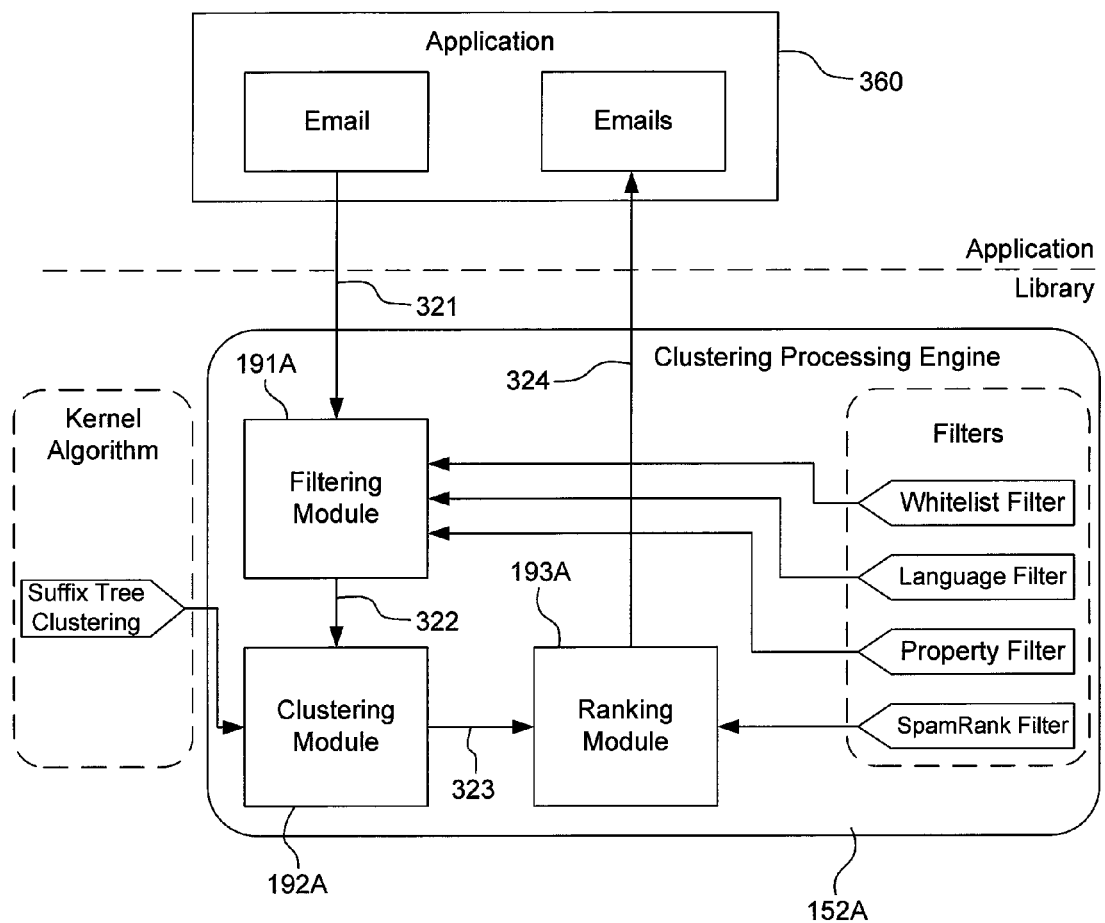
FIG. 6 schematically shows a clustering processing engine employed in an antispam system in accordance with an embodiment of the present invention.

As can be appreciated, the system 300 allows for an iterative learning process for detecting spam. The system 300 performs email clustering, spam identification, fingerprint generation, and spam detection. The system 300 provides an antispam solution that does not necessarily require pattern deployment from an external server outside the network where the system 300 is deployed, avoids legal issues arising from sample sourcing, and has minimal time lag for pattern deployment FIG. 6 schematically shows the clustering processing engine 152A in accordance with an embodiment of the present invention. In the example of FIG. 6, the clustering processing engine 152A includes a filtering module 191A, a clustering module 192A, and a ranking module 193A, which are the same as the filtering module 191, clustering module 192, and ranking module 193, respectively, except specifically configured for email processing only.

In the example of FIG. 6, the filtering module 191A receives emails from an application 360 (arrow 321) configured to work with the components of the system 300. The application 360 may comprise an email server or an antispam product, for example. The application 360 may employ the system 300 to detect whether an email is spam before forwarding the email to its recipient. As can be appreciated, the components of the system 300 may also communicate with each other without using the application 360 as shown in FIG. 5.

In the example of FIG. 6, the filtering module 191A utilizes plug-in filters comprising a whitelist filter, a language filter, and a property filter. The whitelist filter can be customized by users, and could be configured to filter out sender names, sender domains, sender IP, or subject indicated in the whitelist filter. That is, emails having characteristics matching those in the whitelist filter are deemed to be normal, and can thus be forwarded to the user without further analysis. The language filter allows filtering out of unrelated samples according to their nature. For example, an individual email has its language, encoding, and format. As particular examples, western languages are more suitable for word-based clustering, while far eastern languages are more suitable for character-based clustering. This allows emails in particular languages to be filtered out. The property filter allows for grouping emails according to their length, allowing emails of particular lengths to be filtered out. Experiments performed by the inventors indicate that the clustering processing engine 152A performs better when both the language and length of an email are taken into consideration during the filtering process. For example, four clustering processing engines 152A may be used to accommodate different language and word length combinations. Each of the four clustering processing engines 152A may communicate directly, in-parallel with the application 360.

Emails that have not been filtered out by the filtering module 191A are input to the clustering module 192A (arrow 322). In the example of FIG. 6, the clustering module 192A employs suffix tree clustering to perform its clustering function because the intention of an email can be analyzed from its body. Using suffix tree clustering, the longest common subsequence can be found within a satisfactory response time.

The clusters generated by the clustering module 192A are input to the ranking module 193A (arrow 323). The ranking module 193A scores the clusters according to their likelihood of being spam, and ranks the clusters. The ranking module 193A employs a spam rank filter to filter out clusters that are ranked below a threshold.

Figure 7:
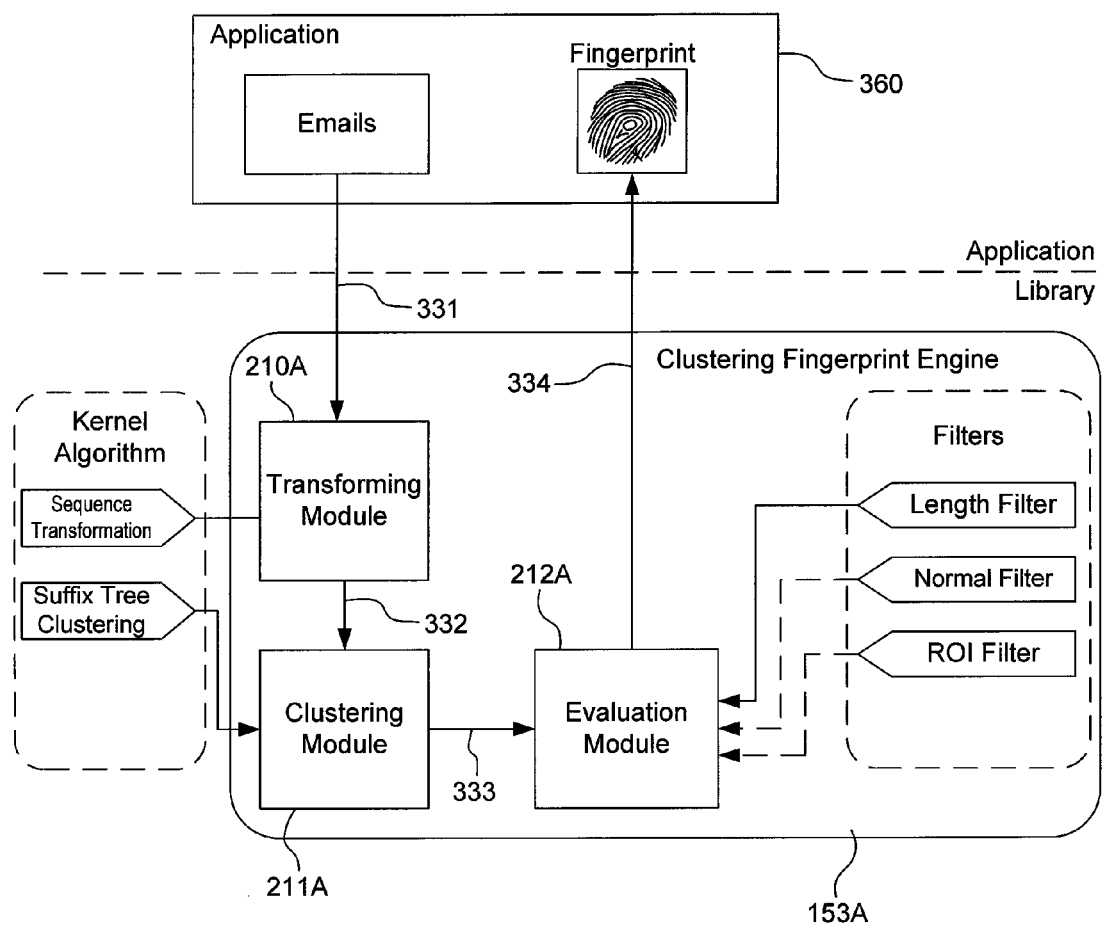
FIG. 7 schematically shows a clustering fingerprint engine employed in an antispam system in accordance with an embodiment of the present invention.

The ranking module 193A passes high ranked clusters to the application 360 (arrow 324), which then provides these clusters to the clustering fingerprint module 153A (FIG. 7, arrow 331). In the example of FIG. 7, the clustering fingerprint 153A comprises a transforming module 210A, a clustering module 211A, and an evaluation module 212A. The transforming module 210A, clustering module 211A, and evaluation module 212A are the same as the transforming module 210, clustering module 211, and evaluation module 212, respectively, except specifically configured for email processing only.

In one embodiment, the transforming module 210A employs offset sequence transformation algorithm to generate transformed clusters. The transformed clusters are input to the clustering module 211A (arrow 332), which uses suffix tree clustering (as in the clustering processing engine 152A) to find the longest common subsequence among all sequences. The longest common subsequences generated by the clustering module 211A for each cluster are provided to the evaluation module 212A (arrow 333).

In the example of FIG. 7, the evaluation module 212A includes three plug-in filters. A length filter filters out short fingerprints because short fingerprints may result in a high number of false alarms. A normal filter calculates the false alarm rate of each fingerprint using a user-defined normal email pool. An ROI (return of investment) filter decides which kind of solution technology is more suitable to represent the intention of the spam cluster (which in this example is represented by suffix automata). If the same content is present in a spam cluster, a hash key solution might be a good candidate for evaluation. If there are many modifications in a spam cluster, an offset sequence transformation algorithm is a better solution because it generates a short but precise fingerprint. In the example of FIG. 7, the evaluation module 212A only uses offset sequence transformation for simplicity. In addition, a fingerprint has at most three contexts with lengths of about six to ten in this example. The fingerprints that pass evaluation are forwarded by the evaluation module 212A to the application 360 (arrow 334).

Figure 8:
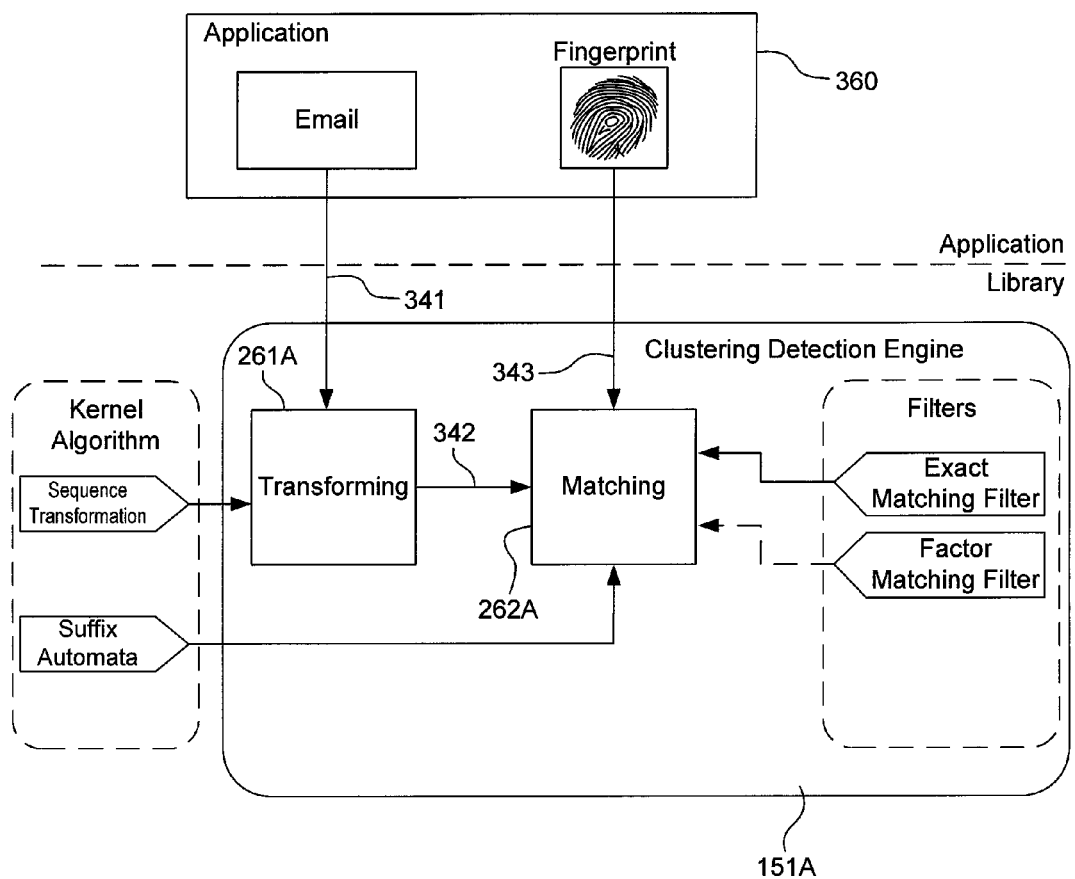
FIG. 8 schematically shows a clustering detection engine employed in an antispam system in accordance with an embodiment of the present invention.

FIG. 8 schematically shows the clustering detection engine 151A in accordance with an embodiment of the present invention. In the example of FIG. 8, the clustering detection engine 151A includes a transforming module 261A and a matching module 262A. The transforming module 261A and the matching module 262A are the same as the transforming module 261 and the matching module 262, respectively, except specifically configured for email processing only.

In the example of FIG. 8, the transforming module 261A is the same as transforming module 210A in the clustering fingerprint engine 153A. The transforming module 261A receives emails to be evaluated for spam from the application 360 (arrow 341), and transforms the emails into a standardized representation, such as sequence representation, that is the same as that used by the clustering processing engine 152A to input emails to the filtering module 191A. The transformation into the standardized representation may be performed by the transforming module 261A or other modules of the clustering detection engine 151A. The sequence representations of the emails are then further transformed by the transforming module 261A using the same algorithm as that used by the transforming module 210A of the clustering fingerprint module 153A.

When the clustering detection module 151A receives a new fingerprint from the application 360 (arrow 343), the new fingerprint is built by the matching module 262A into suffix automata. In this example, an email is deemed spam when that email matches at least one context of a fingerprint. Otherwise, the email is deemed normal.

In one experiment, the system 300 of FIG. 5 is configured to have four clustering processing engines 152A, one clustering fingerprint engine 153A, and one clustering detection engine 151A. An application 360 is used to pass data between the components of the system 300.

In the experiment, email traffic is first injected into the clustering detection engine 151A. If an email is identified as spam, the email will be blocked into a quarantine folder. If the email is identified as normal, it will be passed to the clustering processing engines 152A, which are configured to have the following settings:

Processing Engine 1: western language, length that is larger than 1024, word-based suffix tree clustering.
Processing Engine 2: western language, length that is shorter than 1536, word-based suffix tree clustering.
Processing Engine 3: non-western language, length that is larger than 1024, char-based suffix tree clustering.
Processing Engine 4: non-western language, length that is shorter than 1536, char-based suffix tree clustering.

The clustering processing engines 152A filter out emails that do not match their settings. Each clustering processing engine 152A performs clustering when the time interval reaches 15 minutes or the number of emails added into clustering processing engine 152 is more than 3000. After clustering, the clustering processing engines 152A assess each spam cluster and only pass to the clustering fingerprint engine 153A those clusters that have a high spam ranking. The clusters with low or medium spam rank are fed back to their corresponding clustering processing engine 152A to wait for the next clustering.

The inventors observe that the incremental learning process is able to catch some spammer behaviors, such as triggering only several Botnets to send spam in turns rather than all of Botnets at the same time. For calculation of spam rank, the experiment employed four rules as follows:

Rule 1: Ratio of unique sender domains to all emails in a cluster. If the ratio is larger than 0.29 and the number of unique sender domains is more than 1, the score is 2. Otherwise, the score is 0.
Rule 2: Ratio of unique subjects to all emails in a cluster. If the ratio is larger than 0.45 and the number of unique subjects is more than 1, the score is 1. Otherwise, the score is 0.
Rule 3: Number of unique sender IPs in a cluster. If the number is larger than 18 and the number of unique sender countries is more than 1, the score is 3. Otherwise, the score is 0.
Rule 4: Ratio of unique URLs to all emails in a cluster. If the ratio is larger than 0.45 and the number of unique URLs is more than 1, the score is 1. Otherwise, the score is 0.

The spam rank can be calculated according to the above four rules. If the score is less than two, then the spam rank is low. If the score is greater than three, then the rank is high. Otherwise, the spam rank is medium.

After receiving a spam cluster with high spam rank from the clustering processing engine 152A engine (by way of the application 360), the clustering processing engine 153A generates a qualified fingerprint for the spam cluster and sends the qualified fingerprint to the clustering detection engine 151A immediately. This allows the clustering detection engine 151A to detect successive spam attacks.

The inventors also evaluated whether offset sequence technology reduces memory usage compared to hash key solutions. Without loss of detection rate and penalty of false positive, expected memory requirement and computation consumption of a suffix automata approach should be less than hash key solution.

Figure 9:
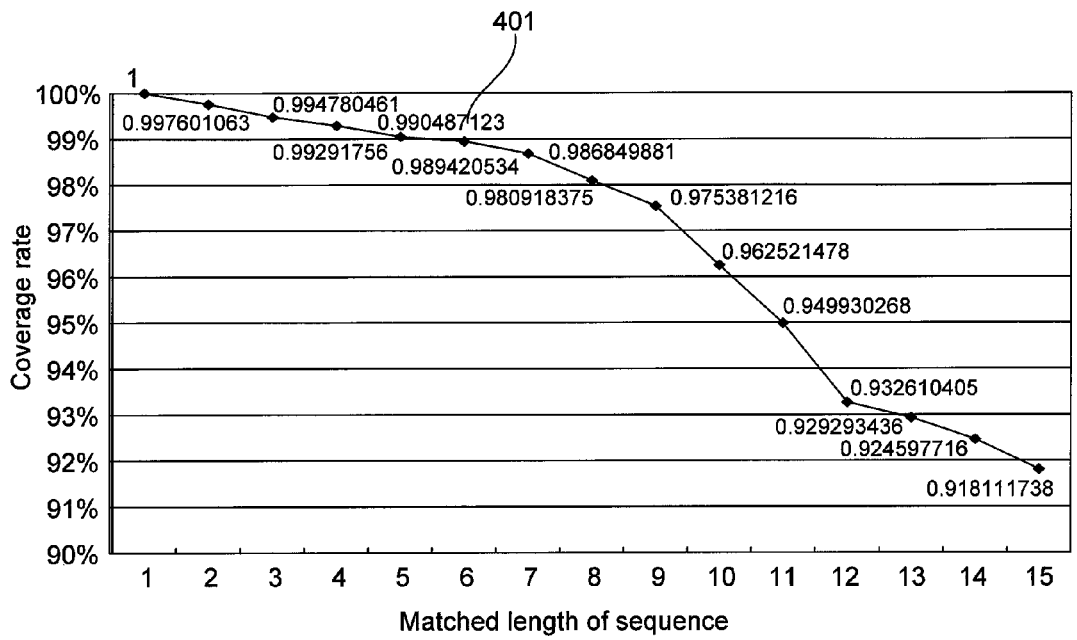
FIG. 9 shows detection rates in an experiment using an antispam system in accordance with an embodiment of the present invention.
Figure 10:
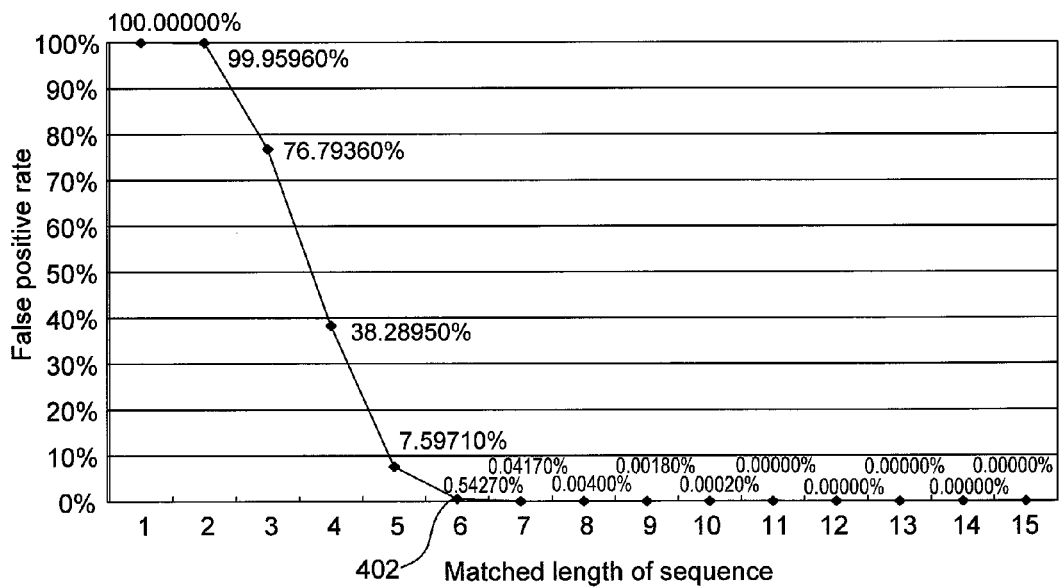
FIG. 10 shows false positive rates in an experiment using an antispam system in accordance with an embodiment of the present invention.

The experiment employed a pool of normal emails to evaluate false positive rates. The pool has more than 40 GB of emails. FIGS. 9 and 10 show detection rates and false positive rates, respectively, based on 21,057 clusters. If the length of a matched sequence is 6, the detection rate by using suffix automata with context 'A' achieves 98.9% (FIG. 9, data point 401) and the false positive rate is less than 0.55% (FIG. 10, data point 402). When the length of a matched sequence increases, lower detection rate and lower false positive rate are needed. In one embodiment, the system 300 uses the top n longest offset sequence for context selection (n=3 in the experiment). In the experiment, this approach performs more effectively and efficiently compared to a fixed context approach.

To evaluate memory usage of suffix automata, three different scales for the cluster size, such as 10, 1000, and 21,056 clusters, are chosen for the experiment. First, a single suffix automata of context "A," which comprises an alphabet extracted from the content of an email, is chosen. Generally speaking, the single context approach uses less memory and consumes less computational resources. However, this approach may have less detection capability and higher false positive rate compared to other approaches. From Table 1, it can be seen that a hash key solution has high memory consumption growth rate compared to suffix automata.

TABLE 1

| Number of cluster | Suffix Automata of context "A" | Hash key solution |
|---|---|---|
| 10 | 3,688 | 480 |
| 1000 | 41,860 | 53,120 |
| 21056 | 92,836 | 693,888 |

Figure 11:
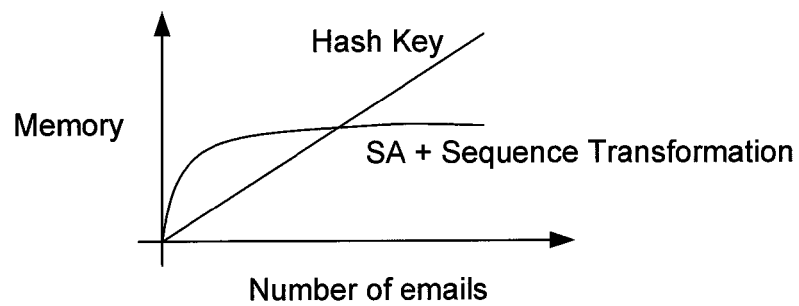
FIG. 11 shows memory usage comparison between hash key and suffix automata with sequence transformation.

In Table 1, the number below the column for the suffix automata and hash key represents memory usage in KB for a given number of clusters. For 21,056 spam clusters, the hash key solution needs more than 690 KB memory, while suffix automata only use less than 100 KB. The inventors thus estimate that memory usage comparison between hash key and suffix automata with sequence transformation is as shown in FIG. 11.

Figure 12:
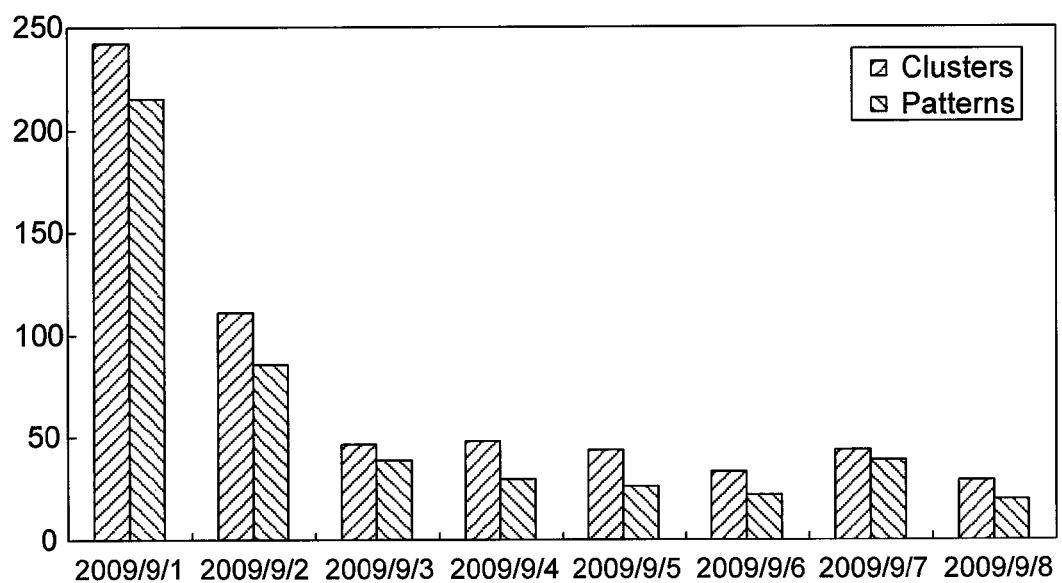
FIG. 12 shows a graph of the number of clusters and fingerprints generated in an experiment using an antispam system in accordance with an embodiment of the present invention.

FIG. 12 shows that the system 300 has processed emails obtained from honeypots from Sep. 1, 2009 to Sep. 8, 2009. In this period, the clustering processing engine 152A generated 598 spam clusters, and the clustering fingerprint engine 153A generated 477 fingerprints. As shown in FIG. 12, there are 242, 111, and 47 clusters generated by the clustering processing engine 152A in 9/1, 9/2, 9/3, respectively. About 40 clusters were generated in the remaining days. In addition, the system 300 is able to generate fingerprints for detection for about 80% of the clusters.

Figure 13:
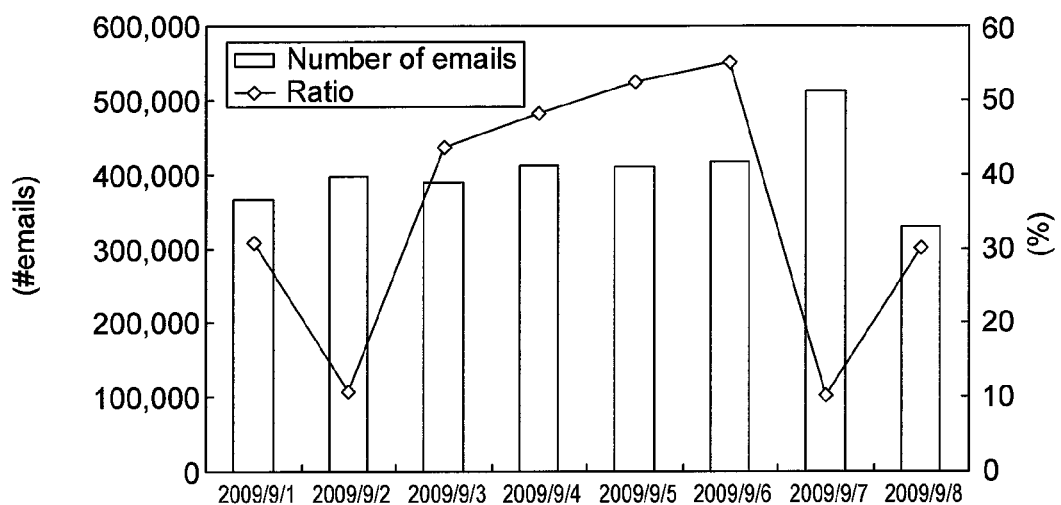
FIG. 13 shows the number of emails received by a clustering processing engine and the ratio of clustered emails to all emails in an antispam system in accordance with an embodiment of the present invention.

FIG. 13 shows the number of emails received by the clustering processing engine 152A and the ratio of clustered emails to all emails. There are more than 300,000 emails that the clustering detection engine 151A could not detect that are passed to the clustering processing engine 152A. The average ratio of clustered emails to all emails in the clustering processing engine 152A is about 35%. However, the ratio dropped significantly in Sep. 2, 2009 and Sep. 7, 2009 because most of the spam attacks were ranked as low or medium in those two days. Taking newsletters as an example, it is hard to determine whether a newsletter is spam or not. Some users may have subscribed to the newsletter to get information, while other users may have not and find the newsletter annoying. In the experiment, most legitimate newsletters are clustered with low spam rank. "Legitimate newsletter" means that a user has subscribed to the newsletter. Some newsletters are simply spam and received a high spam rank. Additionally, there was a heavy attack with more than 4,500 emails received from the honeypots on Sep. 6, 2009, so the ratio of clustered emails to all received emails reached a peak on that day. FIG. 14 shows an example email received from the honeypots on Sep. 6, 2009.

FIG. 15 shows information for an example spam cluster generated by the clustering processing engine 152A in accordance with an embodiment of the present invention. FIG. 15 indicates the longest common subsequence among all of the emails, the high spam rank of 3, the number of emails, the predicted spam category, all URLs and their domain names and related IP (Internet Protocol) addresses in the cluster. It is interesting to note that the spammer used three different domain names with the same IP address. Also note that the content of each mail is the same or similar as in other emails in the cluster. The only difference is the URL (uniform resource locator) link. The spammer tried to promote fake watches by sending lots of spam. The system 300 was able to detect this spam threat, and create a fingerprint for it.

Figure 16:
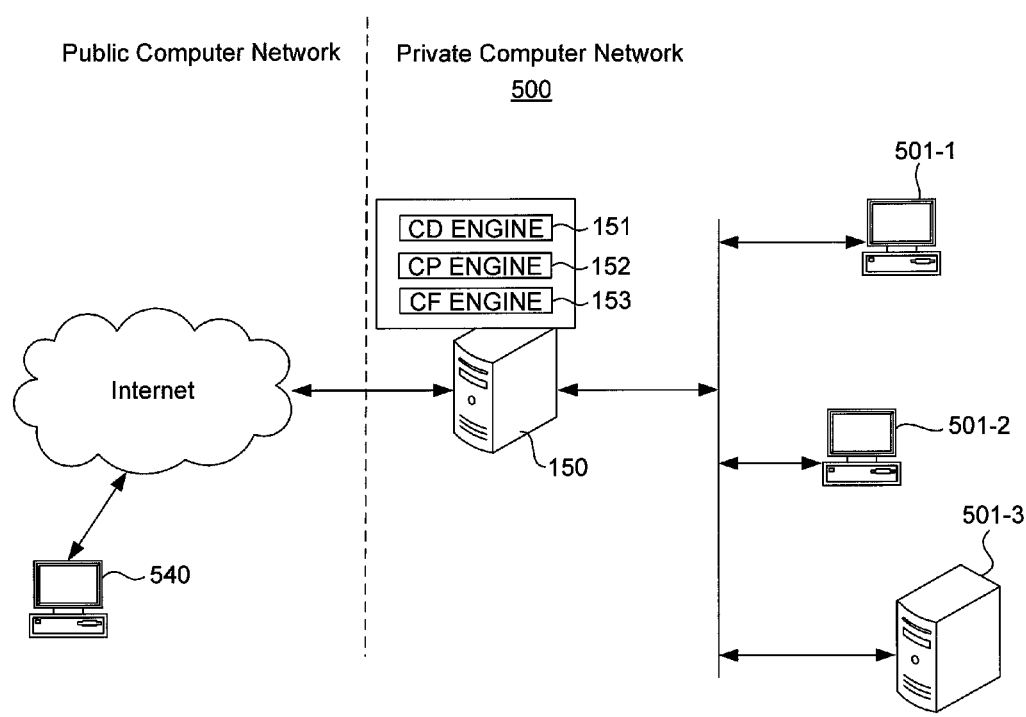
FIG. 16 shows a schematic diagram of a private computer network in accordance with an embodiment of the present invention.

Referring now to FIG. 16, there is shown a schematic diagram of a private computer network 500 in accordance with an embodiment of the present invention. The private computer network 500 may comprise an enterprise network of an organization (e.g., company, government) or a home network. In the example of FIG. 2, the computer network 500 includes a computer system implementing the system 150 (see also FIG. 1) and computers 501 (i.e., 501-1, 501-2, 501-3, ... ). The computer system implementing the system 150 may comprise one or more computers, but a single server computer is shown in FIG. 16 for clarity of illustration. The system 150 comprises the clustering detection engine 151, the clustering processing engine 152, and the clustering fingerprint engine 153, which may be loaded in main memory for execution by processor of the server computer. As can be appreciated, these engines may be loaded in the same computer or separately in different computers.

In the example of FIG. 16, the server computer implementing the system 150 is configured as a gateway and located locally in the network 500. The gateway receives traffic to and from the computer network 500. For example, data transferred by a client computer 501-1 from within the computer network 500 to a computer 540 on the Internet passes through the gateway. This allows the gateway to detect for computer security threats.

As can be appreciated from the foregoing, the system 150 and its variations provide advantages heretofore unrealized. First, using clustering technology, the system 150 does not require pre-collected samples for building a training model for classification of threats. In addition, the system 150 can automatically generate patterns using transformation algorithm and clustering technology to dig out the intention of a group of threats. The system 150 is capable of automatically updating the pattern locally to detect successive threats. The system 150 does not rely on externally provided patterns.

Second, the system 150 provides relatively fast protection against computer security threats. The protection starts at the first reception of a threat. Even with only few samples of a threat variant, a fingerprint may be generated to detect other variants.

Third, the system 150 has no lag in pattern deployment because the patterns (in this case the fingerprints) are generated locally within the computer network where the system 150 is deployed. For computer security vendors, this means the patterns are generated at the customer's site, and the customer does not have to wait for patterns from the vendor. Although the system 150 may use fingerprints received from outside the computer network, the system 150 is operable to use only those fingerprints that are generated locally within the computer network. That is, the system 150 may be locally self-sufficient.

Fourth, the system 150 allows for reduced pattern size. Because the system 150 generates fingerprints with tolerance for mutation, the size of the fingerprints is reduced compared to previous approaches involving hash keys or CRC (cyclic redundancy check) solutions.

Improved techniques for detecting security threats have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting computer security threats in a private computer network, the method to be performed by a computer system and comprising:
    receiving a plurality of target data into the private computer network, the target data coming from outside the private computer network;
    scanning the plurality of target data for computer security threats by matching the target data against a plurality of patterns of malicious codes generated locally within the private computer network;
    blocking a particular target data in the plurality of target data, the particular target data matching a first pattern in the plurality of patterns of malicious codes;
    grouping remaining target data in the plurality of target data that do not match a pattern in the plurality of patterns of malicious codes into a plurality of clusters, each cluster in the plurality of clusters comprising groups of data comprising a computer security threat;
    generating a second pattern of a particular cluster in the plurality of clusters; and
    adding the second pattern to the plurality of patterns of malicious codes generated locally within the private computer network.

2. The method of claim 1 wherein the plurality of patterns of malicious codes is represented by suffix automata and adding the second pattern to the plurality of patterns of malicious codes comprises building the second pattern into the suffix automata.

3. The method of claim 1 wherein the plurality of target data is transformed to standardized representation prior to being scanned for computer security threats.

4. The method of claim 3 wherein the standardized representation comprises sequence representation.

5. The method of claim 1 wherein the computer security threats comprise spam.

6. The method of claim 1 wherein the computer security threats comprise computer viruses.

7. The method of claim 1 further comprising:
    evaluating the particular cluster in the plurality of clusters for false alarms prior to using the second pattern to scan for computer security threats.

8. The method of claim 1 wherein the plurality of target data comprises emails.

9. A computer in a private computer network, the computer comprising memory and a processor for executing computer-readable program code in the memory, the memory comprising:
    a processing logic receiving a plurality of sample data, transforming the sample data into another form as transformed data, and generating clusters of the transformed data;
    a fingerprint logic generating patterns of malicious codes for the clusters of transformed data and evaluating the patterns of malicious codes for false alarms; and
    a detection logic using the patterns of malicious codes generated by the fingerprint engine locally in the private computer network to scan incoming target data coming into the private computer network for computer security threats, and blocking the incoming target data when the incoming target data matches a pattern in the patterns of malicious codes, wherein the detection logic, the processing logic, and the fingerprint logic are within the private computer network.

10. The computer of claim 9 wherein the processing logic transforms the plurality of sample data to sequence representation prior to transforming the sample data to the transformed data, and wherein the detection logic transforms the incoming target data to sequence representation prior to scanning the incoming target data for computer security threats.

11. The computer of claim 9 wherein the processing logic comprises a ranking module that ranks the clusters of the transformed data according to their likelihood of having malicious intentions.

12. The computer of claim 11 wherein the fingerprint logic does not generate a pattern of malicious code for clusters of the transformed data that have a ranking lower than a threshold.

13. The computer of claim 9 wherein the computer security threats comprise spam emails.

14. The computer of claim 9 wherein the computer security threats comprise computer viruses.

15. The computer of claim 9 wherein the plurality of sample data comprises emails.

16. A method of detecting computer security threats in a private computer network, the method to be performed by a computer system within the private computer network and comprising:
    receiving a plurality of incoming emails from another computer outside the private computer network;
    scanning the plurality of incoming emails for spam by comparing the plurality of incoming emails against fingerprints of clusters of spam emails generated locally within the private computer network;
    blocking emails in the plurality of incoming emails that are spam;
    grouping sample emails in the plurality of incoming emails into a plurality of sample clusters;
    calculating a spam score for each sample cluster in the plurality of sample clusters;
    ranking each sample cluster in the plurality of sample clusters according to its spam score;

locally generating within the private computer network particular fingerprints of sample clusters in the plurality of sample clusters that ranked above a threshold; and adding the particular fingerprints to the fingerprints of clusters of spam emails; wherein the fingerprints of clusters of spam emails are represented by suffix automata and the particular fingerprints are built into the suffix automata.

* * * * *